Aug. 26, 1952 G. W. TORRENCE 2,608,024

TELEPHONE BASE AND INDEX

Filed June 21, 1949

INVENTOR.
GEORGE W. TORRENCE

BY

McMorrow, Berman + Davidson
ATTORNEYS

Patented Aug. 26, 1952 2,608,024

UNITED STATES PATENT OFFICE 2,608,024

TELEPHONE BASE AND INDEX

George W. Torrence, Wilmington, Del.

Application June 21, 1949, Serial No. 100,482

1 Claim. (Cl. 45—.5)

This invention relates to improvements in telephone attachments, and more particularly to a base adapted to receive an alphabetic index tablet, memorandum pad, or similar objects.

A main object of the invention is to provide a novel and improved telephone stand adapted to house an alphabetical index pad or the like, said stand being very simple in construction, being very easy to install, and providing very convenient access to the alphabetical index pad or other memorandum device which may be housed in the stand.

A further object of the invention is to provide an improved telephone-supporting device of the type having means for housing an alphabetic index device or other memorandum means, the support device being very compact in size, being neat in appearance, and being very inexpensive to manufacture.

Further objects and advantages of the invention will become apparent from the following description and claim, and from the accompanying drawings, wherein:

Figure 1:
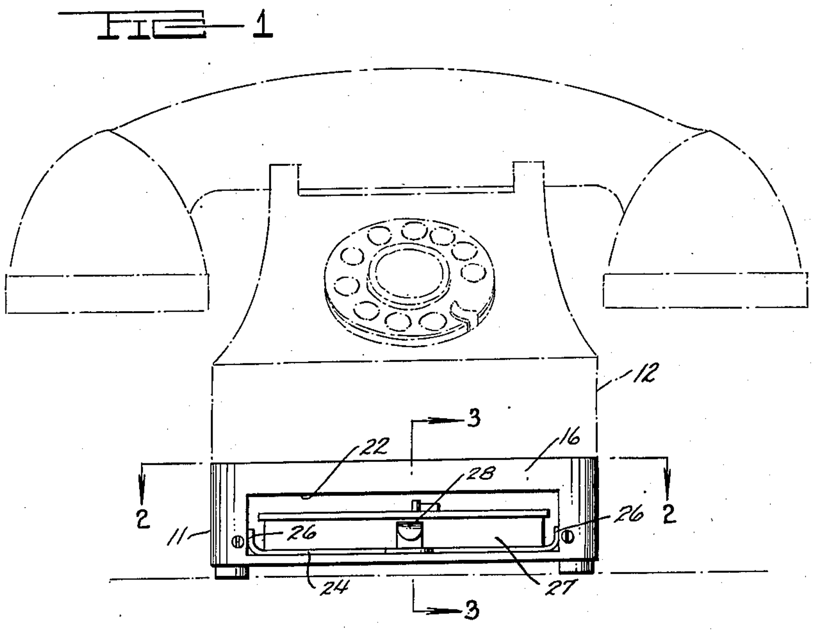
Figure 1 is a front elevational view of an improved telephone stand constructed in accordance with the present invention, said stand being shown with a telephone, in dotted view, mounted thereon.

Referring to the drawings, the telephone-supporting stand comprises a generally rectangular pan member 11 conforming in horizontal plan to the size and shape of the base portion of a conventional telephone set, shown in dotted view at 12. The pan member 11 has a bottom wall 13, side walls 14, 14, a rear wall 15, and a front wall 16. Secured to the corner portions of bottom wall 13 are the supporting feet 17, which may be of deformable material, such as felt, or the like, to protect the surface subadjacent the device against being scratched or marred. The top margins of the side walls 14, 14 are formed with inwardly-directed flanges 18, 18 and the top margins of the front and rear walls 16 and 15 are formed with respective inwardly-directed flanges 19 and 20, said flanges terminating short of the corners of the pan member 11 to define open corner spaces adapted to receive the corner supporting feet of a conventional telephone set.

Figures 2, 3, 4:
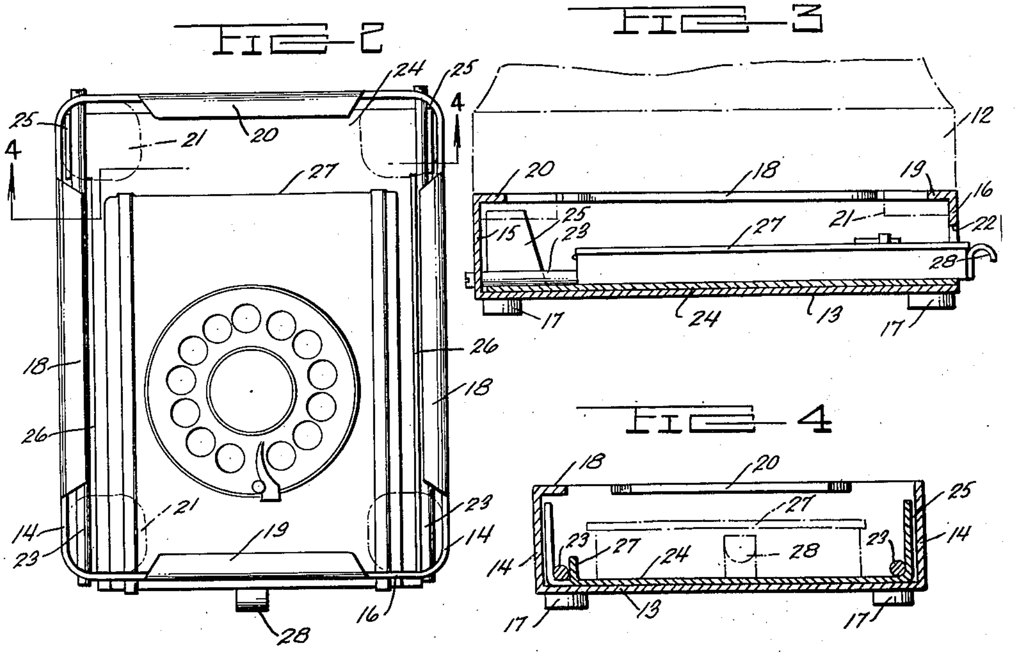
Figure 2 is a top plan view of the telephone stand device of Figure 1, taken on line 2—2 of Figure 1.
Figure 3 is a cross-sectional view taken on line 3—3 of Figure 1.
Figure 4 is a cross-sectional view taken on line 4—4 of Figure 2.

In Figure 2, the positions of said feet are shown in dotted view at 21. When the feet of the telephone set are thus received in the corner spaces of the pan member, the body of the telephone set will be supported on the flanges 18, 18, 19 and 20, and the telephone set will be substantially flush with the walls of the pan member.

The front wall 16 of the pan member is formed with the horizontally-extending slot 22. Secured to the front and rear walls 16 and 15 and extending adjacent and parallel to the side walls 14, 14 are the respective longitudinal guide rods 23, 23. Slidably mounted on the bottom wall 13 and slidably extensible through slot 22 is a tray member 24. Tray member 24 is formed at its rear corners with upstanding side lugs 25, 25 extending outwardly adjacent the guide rods 23, 23 and inwardly adjacent the side walls 14, 14 of the pan member. The tray member is further formed along its side margins with upstanding longitudinal flanges 26, 26 extending for the major portion of the length of the tray member and being located inwardly adjacent the guide rods 23, 23.

A conventional alphabetical index device 27 may be secured on the tray member 24, said device 27 having a front finger tab 28 which extends outwardly of the slot 22 when the tray member is in its fully-housed position in the pan member. The slot 22 is large enough to allow the tray member 24 and the index device 27 to pass therethrough when the tray member is pulled forwardly by means of the finger tab 28 of the index device. As shown in Figure 2, the index device 27 terminates short of the outer guide flanges 25, 25, so that the tray member 24 may be drawn outwardly to a position fully uncovering the index device 27 to allow said index device to be opened. In this outwardly-drawn position, the guide flanges 25, 25 abut the side portions of front wall 16 adjacent the ends of slot 22 to prevent complete withdrawal of the tray member 24. When the tray member is returned to its fully-housed position in pan member 11, the rear ends of flanges 25, 25 abut the rear corners of the pan member.

Any desired type of index device, memorandum pad, or the like, may be secured on the tray member 24 in place of the specific index device shown in the drawings.

While a specific embodiment of an improved telephone-supporting device and holder for an alphabetical index have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A supporting stand for a telephone set comprising a rectangular pan having an open top, means extending inwardly from the walls of said pan contiguous to the open top thereof and secured thereto for the support thereof of the telephone set, there being an elongated opening provided in an end wall of said pan having its ends terminating contiguous to and spaced from the adjacent side walls of said pan, a pair of horizontally disposed guide bars arranged longitudinally of and interiorly of said pan and each supported in a space intermediate the adjacent end of said slot and the adjacent side wall of said pan, a tray member positioned within said pan and mounted therein for longitudinal extensile and retractile movement through said opening, and means carried at the sides of said tray and engaging said guide bars for guidingly supporting said tray on said guide bars and for limiting the extensile movement of said tray, said means comprising an upstanding lug arranged longitudinally of and spaced outwardly of each of the sides of said tray member adjacent the end remote from the pan end wall having the opening and engageable with one side of the adjacent guide bar, and an upstanding flange arranged longitudinally of and along each of the sides of said tray member and extending from the end of the tray member adjacent the pan end wall having the opening, and terminating at a point spaced from the adjacent lug, said flange being engageable with the other side of the adjacent guide bar, each of said lugs being of a height greater than that of the opening in said pan end wall with each of the flanges being of a height less than that of the opening in said pan end wall.

GEORGE W. TORRENCE.

REFERENCES CITED

The following references are of record in the file of this patent:

UNITED STATES PATENTS

| Number | Name | Date |
|---|---|---|
| 1,425,559 | Wampach et al. | Aug. 15, 1922 |
| 2,432,760 | Higbee | Dec. 16, 1947 |
| 2,479,752 | Lohr | Aug. 23, 1949 |